(12) United States Patent
Akyildiz (10) Patent No.: US 9,221,371 B2
(45) Date of Patent: Dec. 29, 2015

(54) PIVOTABLE HEAD RESTRAINT

(75) Inventor: Alisan Akyildiz, Heiligenhause (DE)

(73) Assignee: Johnson Controls Technology Company, Holland, MI (US)

(*) Notice: Subject to any disclaimer, the term of this patent is extended or adjusted under 35 U.S.C. 154(b) by 169 days.

(21) Appl. No.: 13/811,381

(22) PCT Filed: Jul. 27, 2011

(86) PCT No.: PCT/EP2011/003753
§ 371 (c)(1),
(2), (4) Date: Apr. 25, 2013

(87) PCT Pub. No.: WO2012/013336
PCT Pub. Date: Feb. 2, 2012

(65) Prior Publication Data
US 2013/0207438 A1  Aug. 15, 2013

(30) Foreign Application Priority Data
Jul. 28, 2010  (DE) .................. 10 2010 032 677

(51) Int. Cl.
*B60N 2/48*  (2006.01)

(52) U.S. Cl.
CPC .............. *B60N 2/487* (2013.01); *B60N 2/4855* (2013.01)

(58) Field of Classification Search
CPC .... B60N 2/487; B60N 2/4873; B60N 2/4855; B60N 2/4858
USPC .................................. 297/408, 403
See application file for complete search history.

(56) References Cited

U.S. PATENT DOCUMENTS

| | | | |
|---|---|---|---|
| 4,711,494 A | 12/1987 | Davenkamp | |
| 5,669,668 A | 9/1997 | Leuchtmann | |
| 6,302,485 B1 * | 10/2001 | Nakane et al. | 297/408 |
| 6,508,512 B2 * | 1/2003 | Saberan et al. | 297/408 |
| 6,880,890 B1 * | 4/2005 | DeBrabant | 297/408 |
| 7,100,988 B1 * | 9/2006 | Hyslop | 297/376 |
| 7,325,877 B2 * | 2/2008 | Brockman et al. | 297/408 |
| 7,429,082 B2 * | 9/2008 | Kraft et al. | 297/408 |
| 7,431,400 B2 * | 10/2008 | Brawner | 297/408 |
| 8,511,751 B2 * | 8/2013 | Bruck | 297/408 |
| 2008/0203801 A1 | 8/2008 | Jammalamadaka et al. | |

FOREIGN PATENT DOCUMENTS

| | | |
|---|---|---|
| CN | 101410272 A | 4/2009 |
| DE | 3605774 A1 | 12/1987 |
| DE | 19528456 A1 | 2/1997 |
| DE | 19830753 | 1/2000 |

(Continued)

OTHER PUBLICATIONS

International Search Report for application No. PCT/EP2011/003753 mailed Jan. 17, 2012.
International Preliminary Report on Patentability mailed Jan. 29, 2013.
Chinese Office Action mailed Oct. 29, 2014.
Chinese Office Action mailed May 5, 2015.

*Primary Examiner* — Peter Brown
*Assistant Examiner* — Tania Abraham
(74) *Attorney, Agent, or Firm* — Fletcher Yoder, P.C.

(57) ABSTRACT

The invention relates to a head restraint having a head rest element that is provided with at least one retaining rod, in particular on the seat back of a vehicle seat, wherein the head rest element can be reversibly moved from a working position into a stowage position and in particular can be locked in the working position.

3 Claims, 12 Drawing Sheets

(56) References Cited

FOREIGN PATENT DOCUMENTS

| DE | 202004004251 U1 | 5/2005 |
| DE | 102005005826 A1 | 8/2006 |
| EP | 0756964 A2 | 2/1997 |
| JP | H08182571 A | 7/1996 |
| JP | H1111199 A | 1/1999 |
| WO | 0187666 A1 | 11/2001 |
| WO | 2011130279 A1 | 10/2011 |

* cited by examiner

PIVOTABLE HEAD RESTRAINT

CROSS REFERENCE TO RELATED APPLICATIONS

This application claims priority from and the benefit of PCT Application No. PCT/EP2011/003753, filed on Jul. 27, 2011; and German Patent DE 10 2010 032 677.1, filed on Jul. 28, 2010; both entitled "Pivotable Head Restraint", which are herein incorporated by reference.

BACKGROUND

The present invention relates to a head restraint comprising a head rest element which is provided with at least one retaining rod, in particular on the backrest of a vehicle seat, wherein the head rest element is able to be reversibly moved from a position of use into a stowage position and, in particular, is able to be locked in the position of use.

Such head restraints are known from the prior art and are provided, in particular, in the second and third rows of a passenger motor vehicle. If the corresponding vehicle seat on which the generic head restraint is provided is not used, it is advantageous if the head restraint is able to be reversibly moved by a specific angle, preferably 90°-180°, from a position of use into a stowage position. The head rest element should be able to be locked at least in its position of use, in which the head rest element is substantially vertically aligned.

SUMMARY

It was, therefore, the object of the present invention to provide a head restraint comprising a head rest element which is both movable and lockable and which is constructed in the simplest possible manner.

It was, therefore, the object of the present invention to provide a head restraint comprising a head rest element which is both movable and lockable and which is constructed in the simplest possible manner.

The object is achieved by a head restraint comprising a head rest element which is provided with at least one retaining means, in particular on the backrest of a vehicle seat, wherein the head rest element is able to be reversibly moved from a position of use into a stowage position and, in particular, is able to be locked in the position of use, wherein it has a locking mechanism comprising a locking means which engages in a fixed recess for the locking process.

The present invention relates to a head restraint comprising a head rest element which is provided with at least one, preferably two, retaining means, in particular retaining rods, on the vehicle body or on the backrest of a vehicle seat. The support element of such head restraints is preferably provided to be height-adjustable, so that it is able to be adapted to the height of the respective seat occupant. Moreover, the head rest element is reversibly rotatable from a position of use, in which the head rest element is substantially vertically aligned, into a stowage position. Preferably, the angle of rotation from the position of use into the stowage position is between 90° and 180°.

The head rest element has to be locked, in particular in its position of use, so that it is able to absorb forces which potentially occur during use or during an accident, without altering its position.

To this end, the head restraint according to the invention has a locking mechanism comprising a locking means which engages in a fixed recess for the locking process. Said recess is preferably directly provided on the retaining means, preferably the retaining rods. Preferably, the recess has a slot-shaped design.

According to a further subject of the present invention, according to the invention, or preferred subject of the present invention, a locking means is provided for the locking process, said locking means carrying out a substantially linear movement for the locking and unlocking process. During this movement, the unlocking means may be guided through the recess and/or through a slotted guide which is present.

Preferably, the locking means is pretensioned in the locked position thereof. As a result, it is ensured that the head rest element is not automatically unlocked.

According to a further preferred embodiment, the locking means is connected to a rotary lever.

Further preferably, the head restraint comprises a handle which directly or indirectly drives the locking means during the unlocking process thereof. The subsequent unlocking process is then preferably driven by spring means which are present. The person skilled in the art understands that, in particular, the unlocking of the head rest element is able to take place both in a motorized manner or by a different drive.

DRAWINGS

The inventions are described hereinafter with reference to FIGS. 1-13. Said descriptions are provided merely by way of example and do not limit the general inventive idea. The descriptions apply equally to both subjects of the invention.

DETAILED DESCRIPTION

Figure 1:
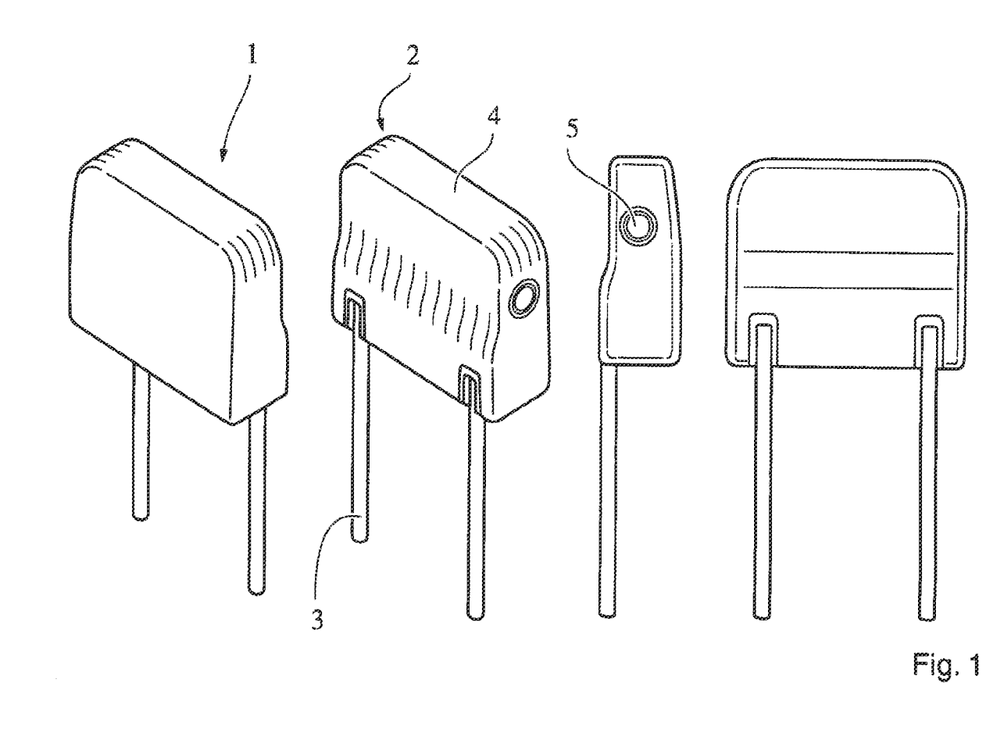
FIGS. 1 and 2 show the head restraint according to the invention.

FIG. 1 shows the head restraint 1 according to the invention, said head restraint comprising a head rest element 2 and in the present case two retaining means 3, in this case retaining rods 3. The retaining rods may be mounted in the backrest of a motor vehicle seat or in the bodywork, for example in the rear parcel shelf. Preferably, the head rest element 2 is provided to be height-adjustable, in particular by the retaining means 3 being moved up and down. Moreover, the head restraint 1 according to the invention comprises a handle 5 which cooperates with a locking/unlocking mechanism 6 in an unlocking manner so that, after the handle 5 has been actuated, the head rest element 2 is able to be reversibly moved from the position of use shown, in which the head rest element 2 is provided substantially vertically, into a stowage position in which the head rest element 2 has been rotated by, for example, 90° or more clockwise.

Figure 2:
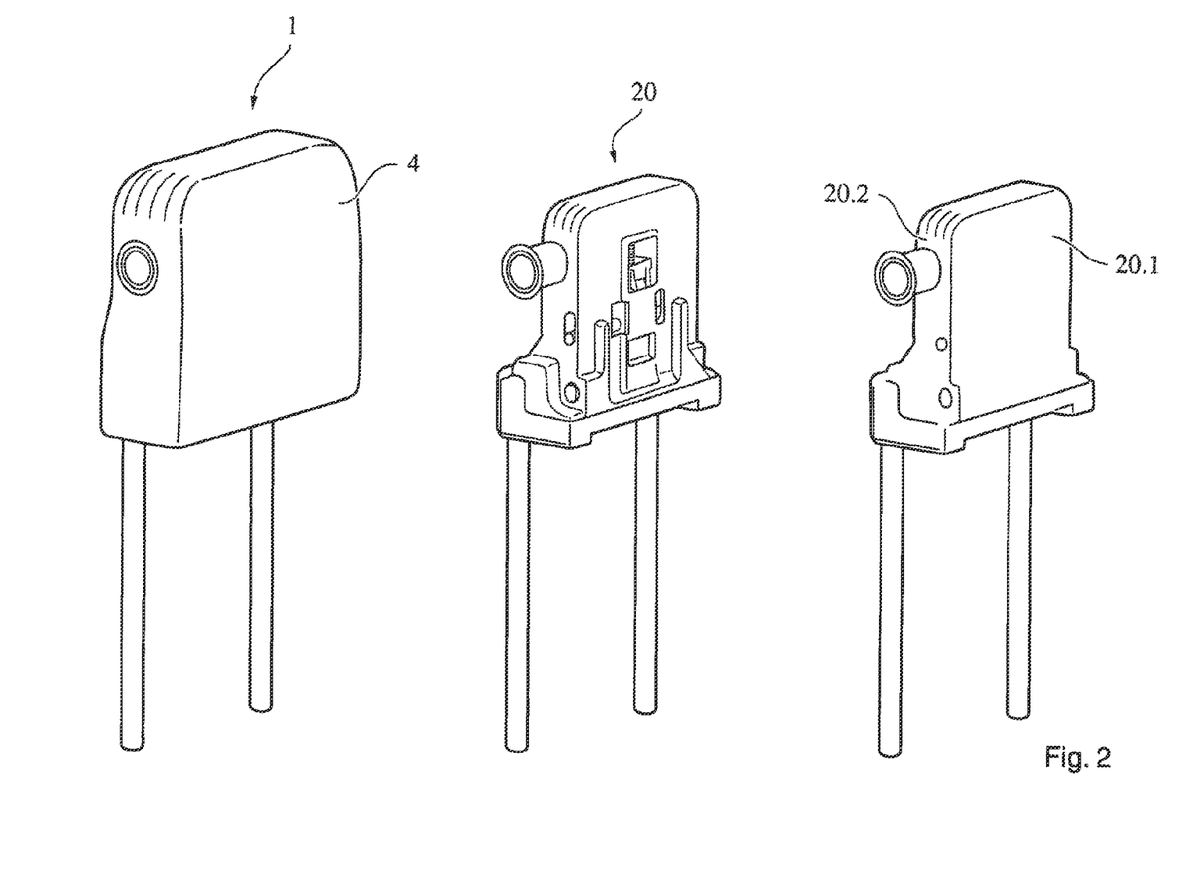

As may be derived, in particular, from FIG. 2, the head rest element comprises a housing 20 which in the present case is made up of a first housing part 20.1 and a second housing part 20.2. Said housing is surrounded at least partially by a cover 4, in particular an upholstered cover.

Figure 3:
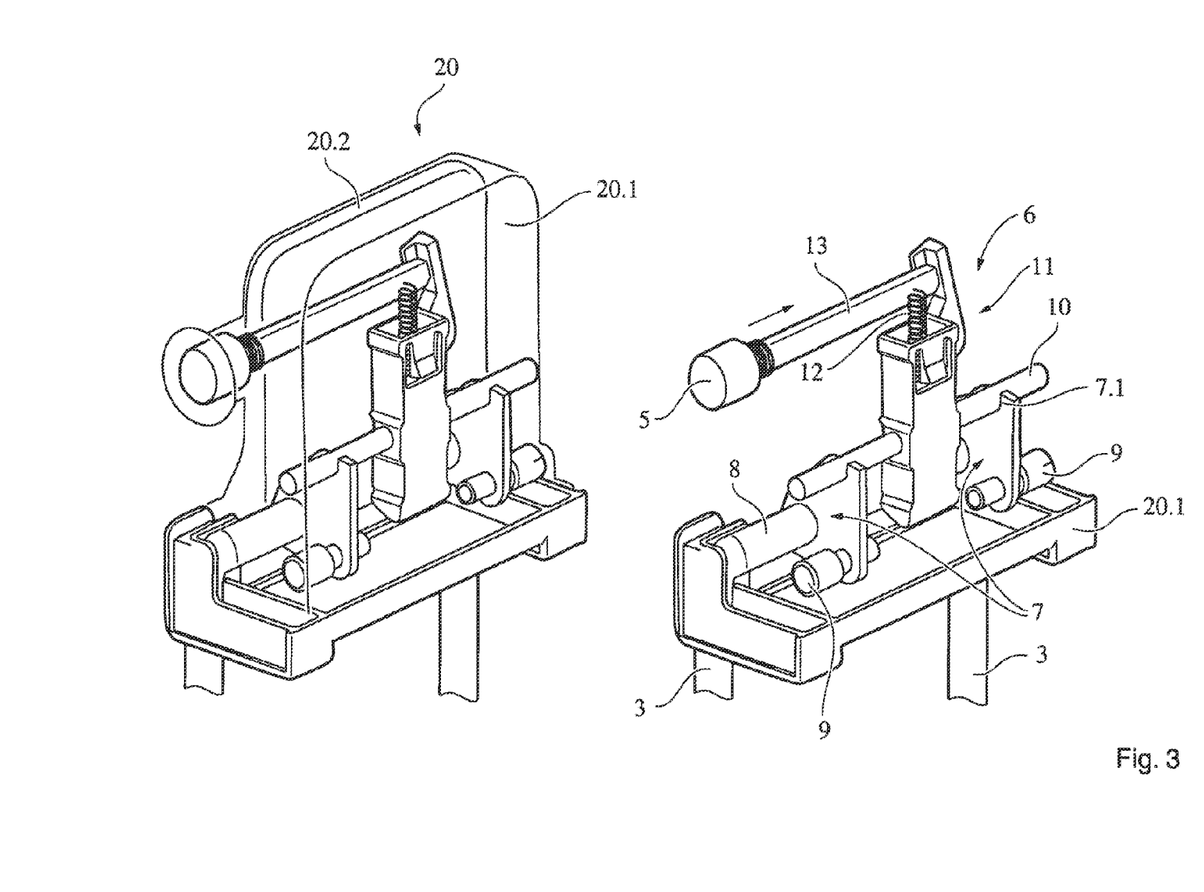
FIGS. 3 and 4 show the locking/unlocking mechanism of the head restraint according to the invention.

FIG. 3 shows the locking/unlocking mechanism according to the invention. As, in particular, may be derived from the right-hand part of FIG. 3, the head restraint has a connecting means 8 which is preferably provided integrally with the retaining means 3. In the present case, the connecting means 8 is a transverse connection between the two retaining rods 3. Two spaced-apart bearings 7, in this case perforated plates, are provided fixedly in terms of rotation on said connecting means 8. Preferably, the bearings 7 are welded to the connecting means 8. The pivot pin 9 of the head rest element 2 is rotatably mounted in said bearing 7 which is fixed relative to the retaining rods. Moreover, the bearing 7 has a recess 7.1, in this case a slot, which for the locking process positively and/or non-positively receives a locking means 10, in this case a locking rod. The locked position of the locking means 10 is shown in FIG. 3. As may be derived, in particular, from FIGS. 7 and 8, for the unlocking process the locking means 10, in particular, is reversibly moved in a linear manner out of the recess 7.1, in this case upwards against the force of gravity. To this end, the head restraint according to the invention comprises an actuating lever 11, in this case a rotary lever, which is directly or indirectly connected to the locking means 10 and which is driven by a handle 5 which has a linkage 13 for unlocking in the direction shown by the arrow. Moreover, the head restraint according to the invention has a spring means 12 which directly or indirectly pretensions the locking means 10 in its locked position.

Figure 4:
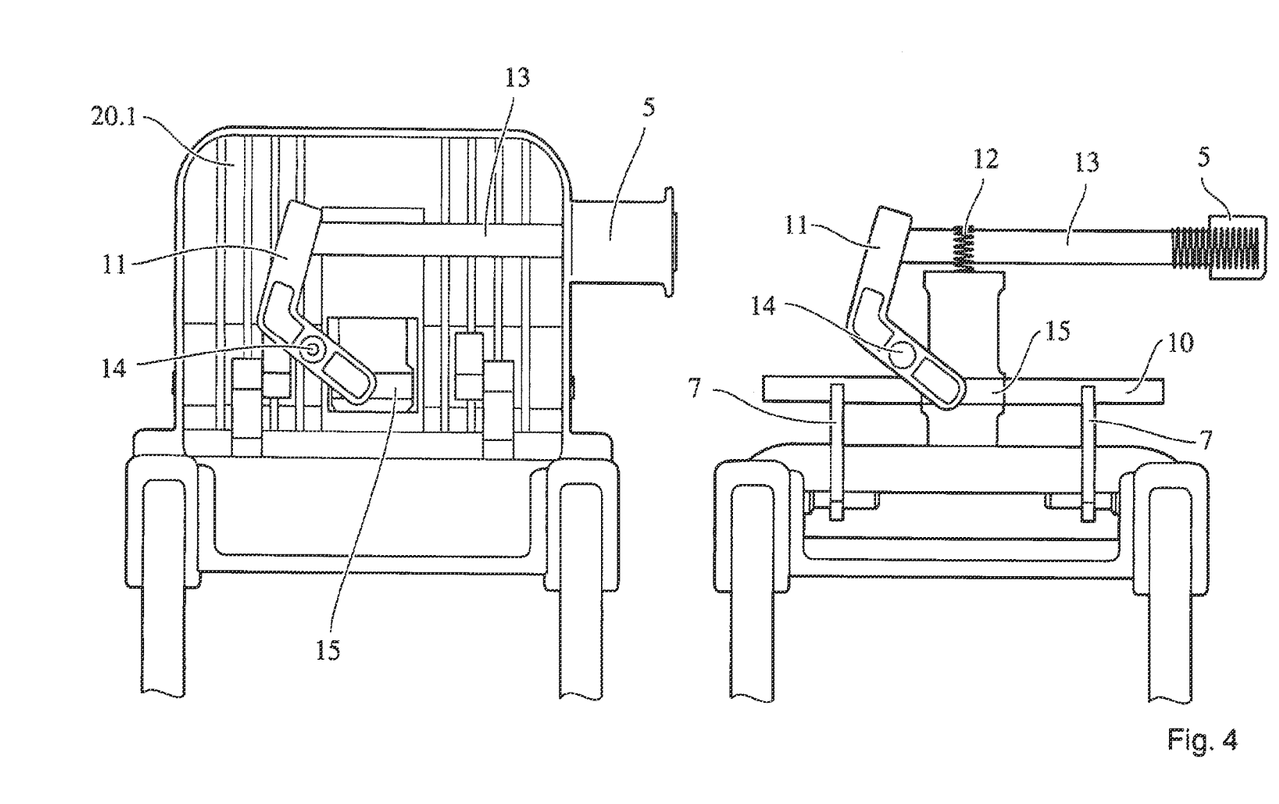

As may be derived, in particular, from FIG. 4, the lever 11 is provided to be rotatable about a pivot pin 14 mounted in the housing 20.1. Moreover, it may be derived from said view that the rotary lever 11 cooperates at its one end with the linkage 13 of the handle 5, whilst its other end cooperates with a connecting means 15 which connects the rotary lever 11 to the locking means 10. Preferably, the locking means 10, in this case the locking rod, is inserted in a recess of the connecting means 15. The rotary lever is rotatably and longitudinally displaceably guided on the connecting means 15, preferably in a groove of the connecting means.

Figure 5:
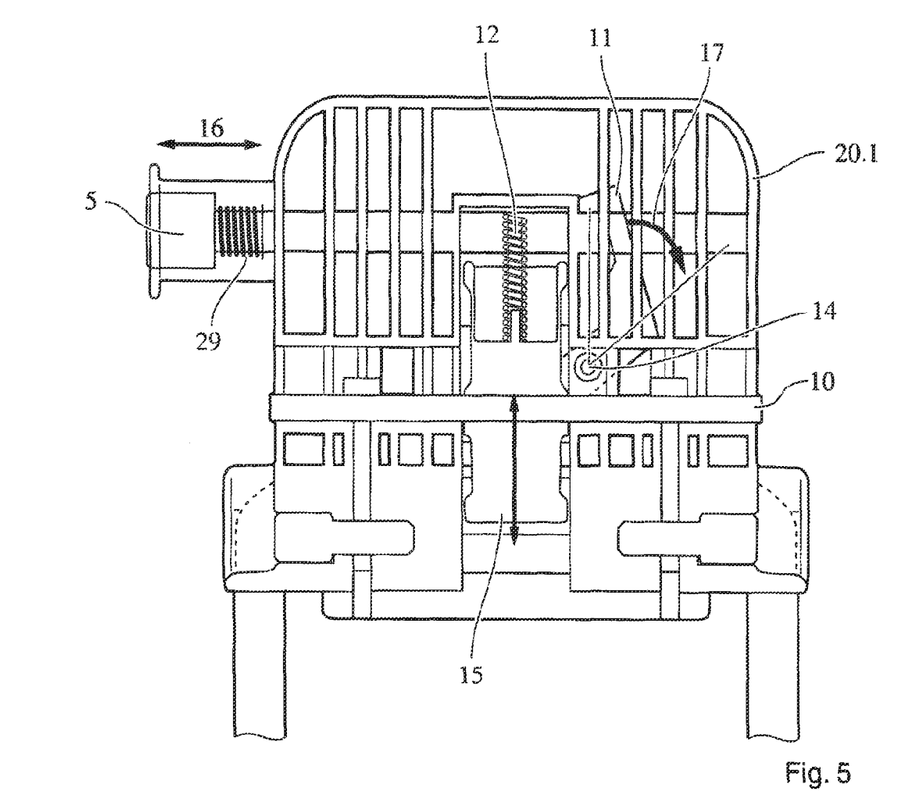
FIGS. 5 and 6 show the unlocking of the locking means.
Figure 6:
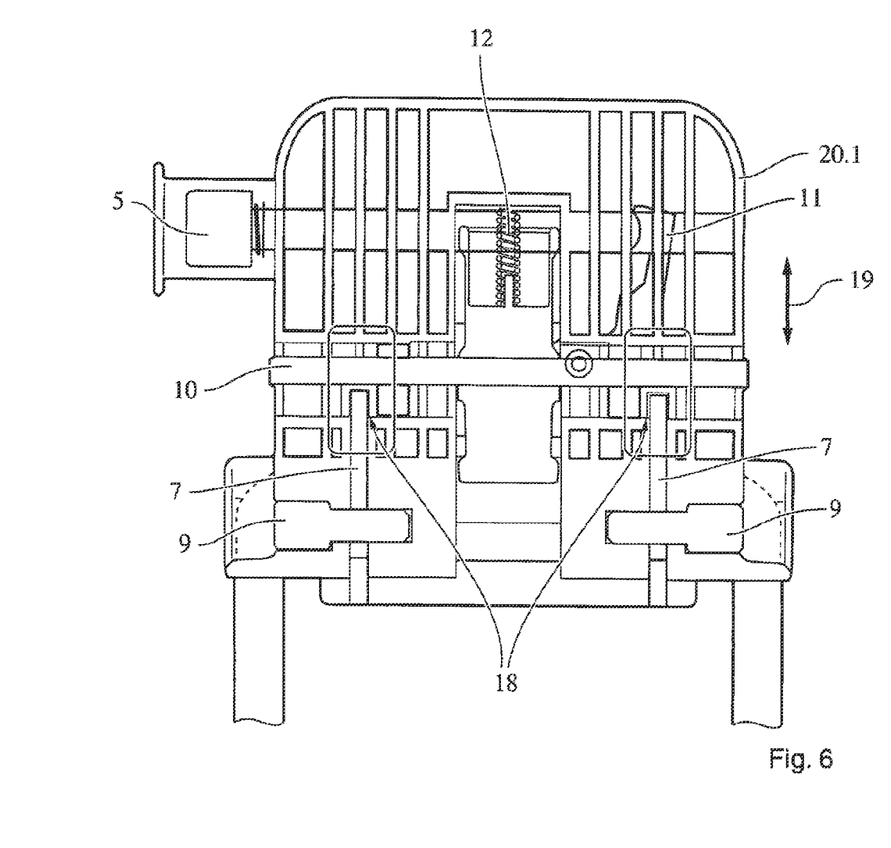

The unlocking of the locking mechanism 6 is shown in FIGS. 5 and 6. By actuating the handle 5 to the right (reference numeral 16) the rotary lever 11, as shown by the arrow 17, is rotated clockwise about the pivot pin 14. As a result, said rotary lever drives the connecting means 15 which, as a result of the rotation of the lever 11 clockwise, performs an upward movement and thereby entrains the locking means 10 and pulls said locking means out of the recess 7.1 in the bearing 7 and, as a result, the unlocked position (reference numeral 18) is produced. The head rest element 2 is now able to be rotated about the pivot pin 9 and may be moved into a stowage position. As soon as the handle 5 has been released again, the spring element 29 presses the handle 5 and thus the linkage 13 into its original position. Moreover, the pretensioning means, in this case the spiral spring 12, attempts to push the connecting means 15 and thus the locking means 10 into its locked position. This takes place as soon as the locking means 10 and the recess 7.1 overlap, i.e. as soon as the head rest element is in its position of use.

Figure 7:
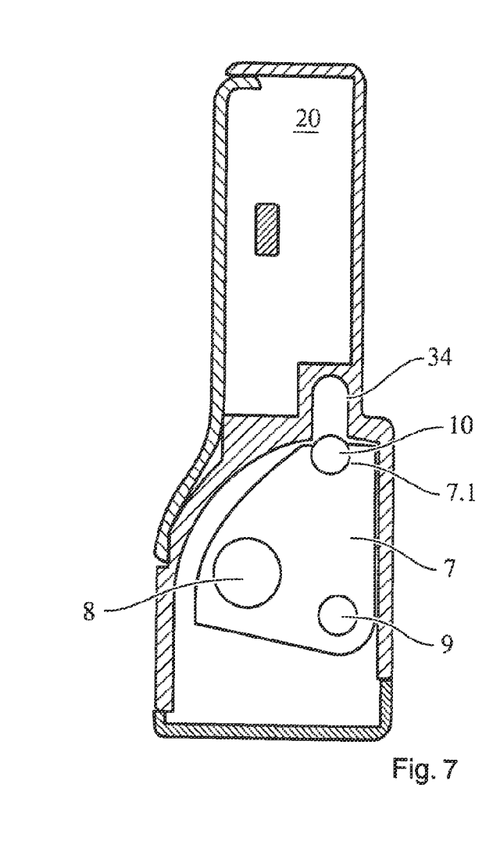
FIGS. 7 and 8 show the pivoting of the head restraint from the position of use into the stowage position.
Figure 8:
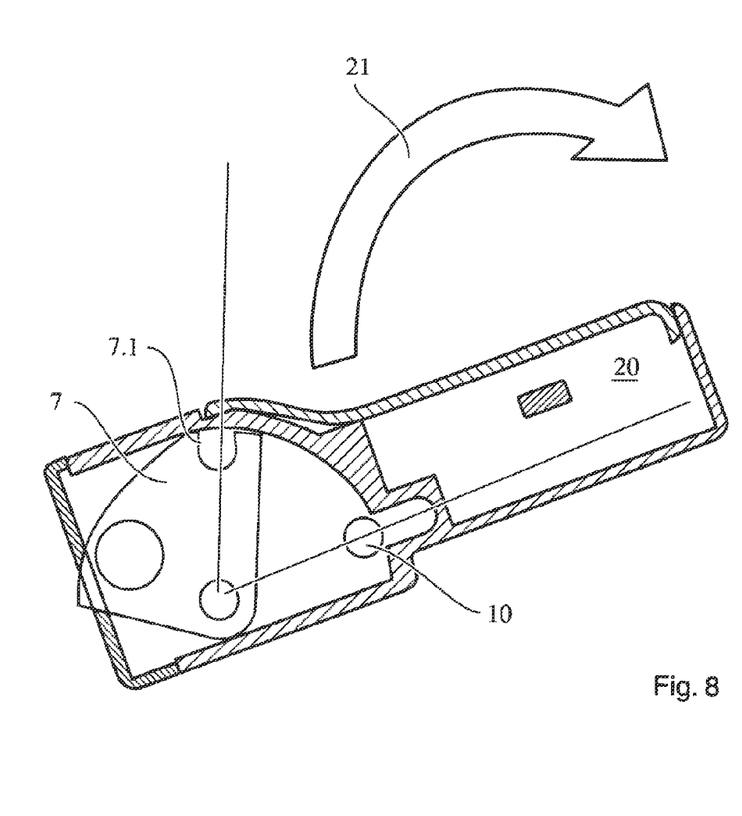

FIGS. 7 and 8 illustrate once again the unlocking and/or the rotation of the head rest element from its position of use into its stowage position. FIG. 7 shows the position of use of the head rest element, of which in the present case only the housing 20 is shown, however. In this position of use, the head rest element is aligned substantially vertically. The bearing 7, in this case the perforated plate, is connected fixedly in terms of rotation to the transverse connection 8 between the two retaining rods. In the bearing 7, the pivot pin 9 of the head rest element is rotatably mounted and/or the housing 20 is provided to be rotatable about the pivot pin 9. As the locking means 10 provided on the housing 20 engages in the slot 7.1 positively and/or non-positively, the housing 20 is locked in its position of use fixedly in terms of rotation to the fixed bearing 7. For the unlocking process, the locking means 10 is moved out of the slot 7.1, as shown by the arrow, and during its movement preferably guided in a slotted guide 34 provided in the housing 20. In this position, the locking means 10 no longer cooperates in a locking manner with the bearing 7 so that the head rest element, as shown in FIG. 8, is able to be rotated from its position of use (FIG. 7) into its stowage position, shown in FIG. 8, along the arrow 21. If the head rest element 2 is intended to be moved back again into its position of use (FIG. 7), the housing 20 is rotated counterclockwise until the locking element 10 overlaps the recess 7.1. The locking element 10 then preferably automatically, but driven by the spring 12, snaps into the recess 7.1 and locks the head rest element 2 in its position of use.

Figure 9:
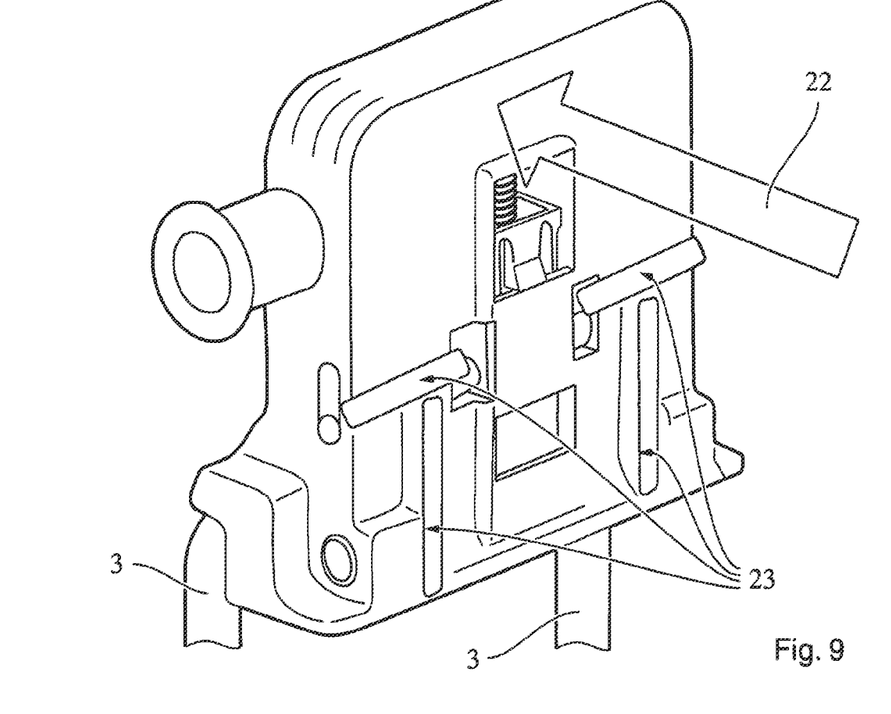
FIG. 9 shows the introduction of force onto the head restraint according to the invention.
Figure 10:
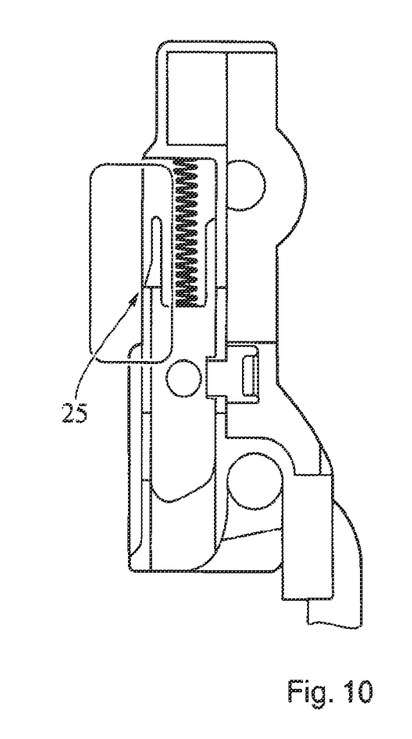
FIG. 10-13 show the mounting of the head restraint according to the invention.

In this position of use, forces 22 (see FIG. 9) which act on the head rest element as a result of use or an accident, are diverted along the surfaces of the housing 20 provided with the reference numeral 23, into the retaining means 3 of the head restraint.

Figure 11:
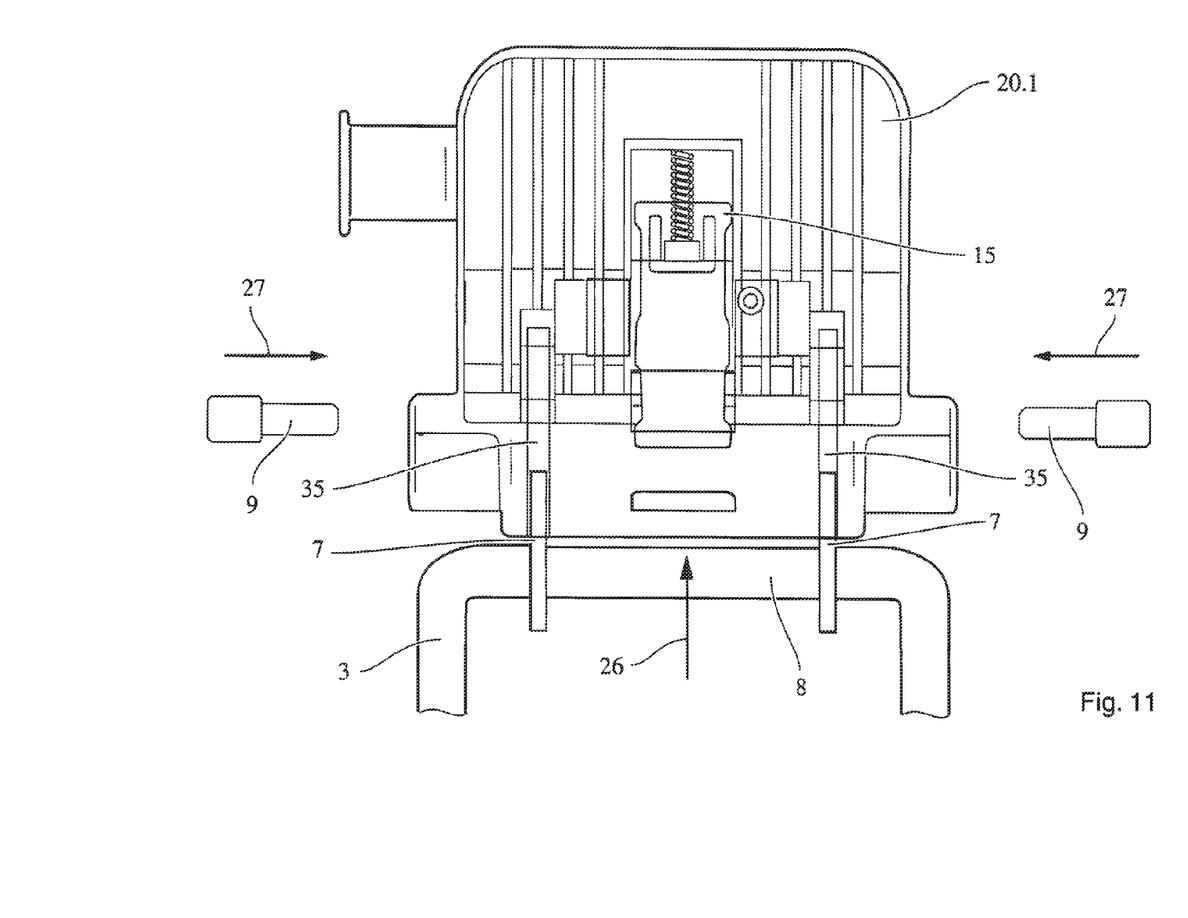
Figure 12:
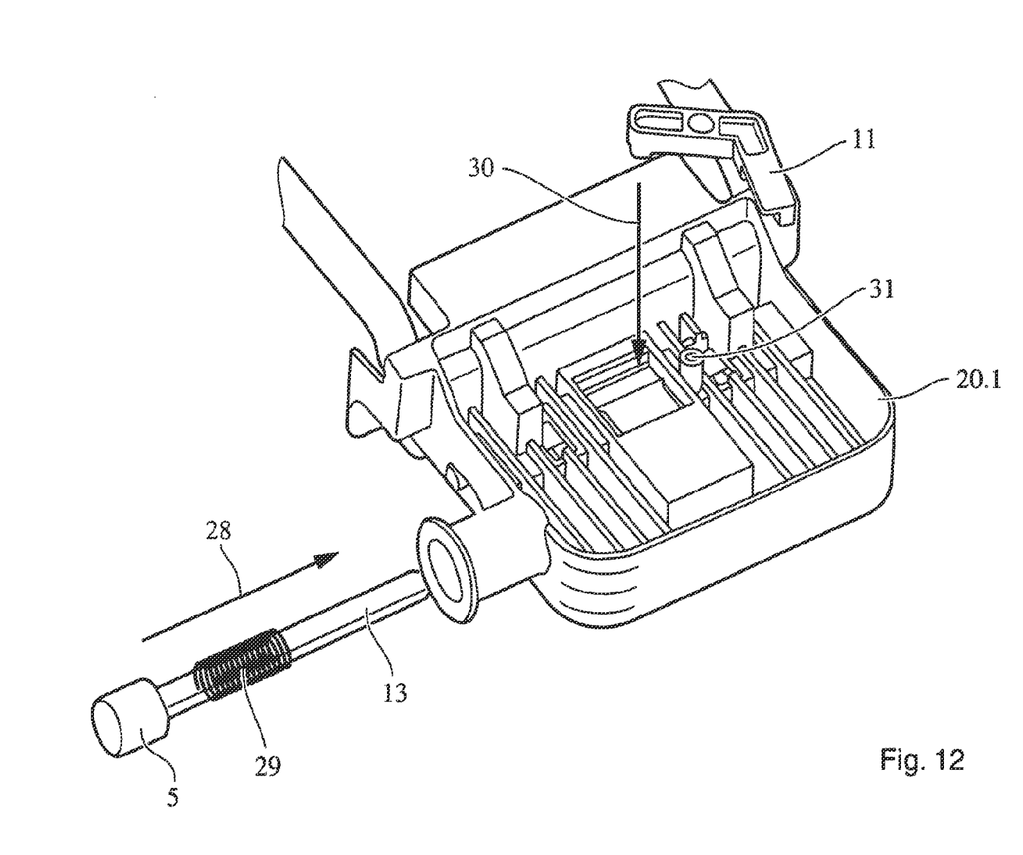
Figure 13:
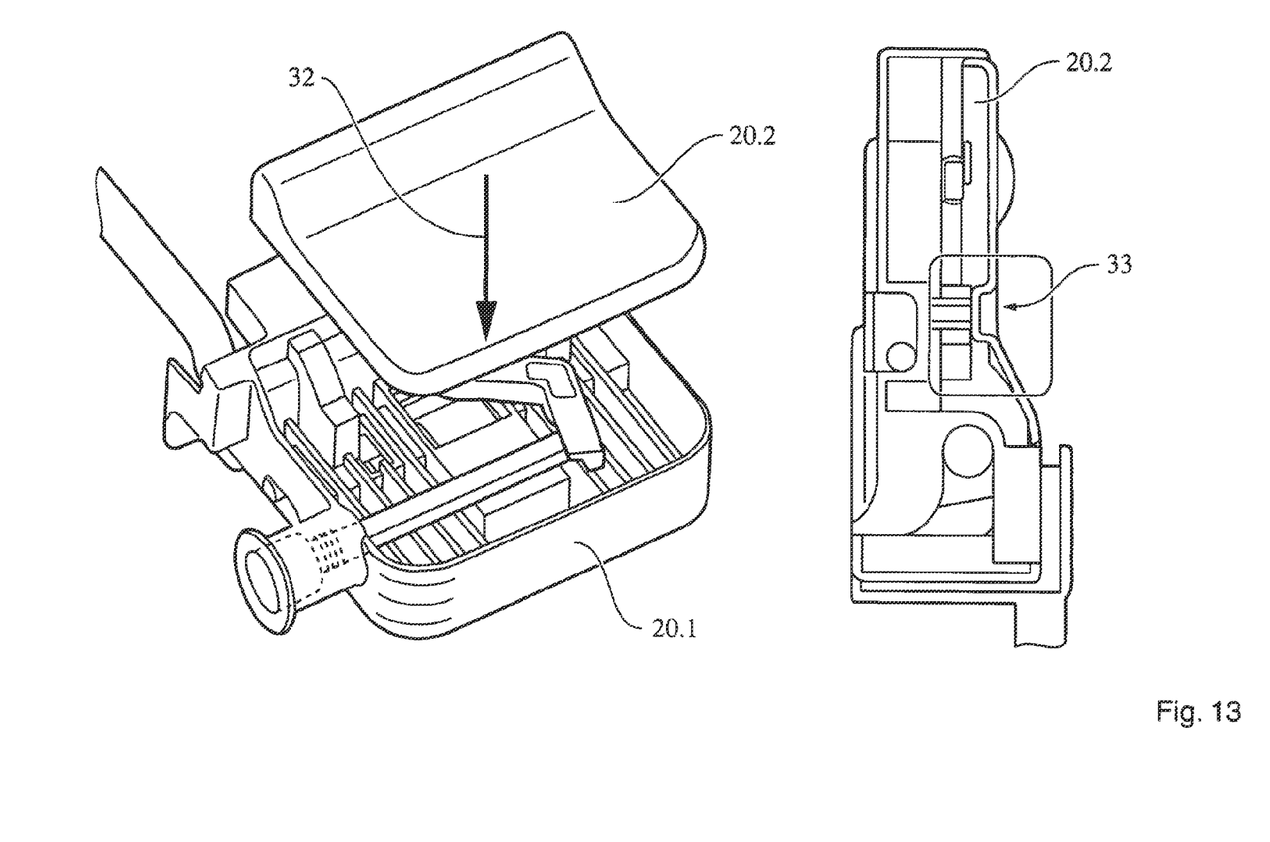

FIGS. 10-13 show the mounting of the head restraint according to the invention. The connecting means 15 on which the pretensioning means, in this case the spiral spring 12, is already arranged, is initially inserted into the first housing 20.1, into a channel 24. The connecting means 15 has a recess 15.1 into which the rod-shaped locking means 10 may be inserted. Moreover, the connecting means 15 has a latching means 15.2, which cooperates in a latching manner with a recess 25 on the housing part 20.1 and prevents the connecting means 15 from automatically slipping out of the channel 24 again. FIG. 11 shows the connection of the housing 20.1 to the retaining means of the head restraint according to the invention. The bearings 7 welded to the transverse connection 8 are inserted into slots 35 which are provided in the housing 20.1, and in this position are secured by the two pivot pins 9 which are introduced into the first housing part 20.1, also shown by the arrow 27. Then, as shown in FIG. 12, the lever 11 is provided on the housing 20.1, by the pivot pin 14 being inserted into a recess 31 of the housing 20.1. Moreover, the linkage 13 of the handle 5 is inserted into the first housing part 20.1, as symbolized by the arrow 28. Subsequently, the second housing part 20.2 is fastened to the first housing part 20.1, as shown by the arrow 32. The second housing part 20.2 bears against the lever 11 or has a very small spacing relative thereto and thus secures the pivot pin 14 in the recess 31.

The invention claimed is:

1. A head restraint comprising:
a head rest element and two retaining rods, wherein the two retaining rods are configured to be mounted in a backrest of a vehicle seat, the head rest element is configured to be reversibly moved from a use position into a stowage position, the head rest element is configured to be locked in the use position, and the head rest element comprises a locking mechanism having a locking device;
a transverse connector extending between the two retaining rods;
two fixed bearings coupled to the transverse connector between the two retaining rods, wherein the two fixed bearings are spaced apart from one another along the transverse connector, wherein the head rest element is rotatably mounted to the two fixed bearings and configured to rotate relative to the two fixed bearings about a rotation axis, each of the two fixed bearings comprises a respective fixed recess, the locking device is moveable between a locked position and an unlocked position via translation in a direction substantially perpendicular to the rotation axis, the locking device is configured to engage the respective fixed recesses while in the locked position to block movement of the head rest element from the use position, the locking device is configured to disengage the respective fixed recesses while in the unlocked position to facilitate movement of the head rest element to the stowage position, and the locking device is biased toward the locked position; and a rotary lever connected to the locking device, wherein the rotary lever is configured to drive the locking device to move between the locked position and the unlocked position via rotation of the rotary lever.

2. The head restraint as claimed in claim 1, wherein the locking device is configured to move substantially linearly between the locked position and the unlocked position.

3. The head restraint as claimed in claim 1, comprising a handle configured to drive the rotary lever to rotate.

* * * * *